(12) United States Patent
Du et al.

(10) Patent No.: US 11,938,755 B2
(45) Date of Patent: *Mar. 26, 2024

(54) SPLIT FRONT AXLE AND VEHICLE HAVING SAME

(71) Applicant: Shanghai Linghuo Trading Co., LTD., Shanghai (CN)

(72) Inventors: Dehui Du, Shanghai (CN); Jia Fu, Shanghai (CN)

(73) Assignee: SHANGHAI LINGHUO TRADING CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,253

(22) Filed: Jan. 19, 2023

(65) Prior Publication Data

US 2023/0241915 A1    Aug. 3, 2023

(30) Foreign Application Priority Data

Jan. 30, 2022   (CN) .......................... 202220246510.7

(51) Int. Cl.
*B60B 35/14* (2006.01)
*B60B 35/16* (2006.01)

(52) U.S. Cl.
CPC .............. *B60B 35/14* (2013.01); *B60B 35/16* (2013.01); *B60B 2310/305* (2013.01)

(58) Field of Classification Search
CPC ... B60B 35/14; B60B 35/16; B60B 2310/305; B60B 35/122; B52D 7/18; F16B 7/0406; F16B 74/607

(Continued)

(56) References Cited

U.S. PATENT DOCUMENTS 1,209,134 A  *  12/1916  Dodge .................... B60B 35/16
                                                    301/137
4,134,700 A     1/1979   Nelson et al.
(Continued)

FOREIGN PATENT DOCUMENTS

CA        3193053 A1  *  4/2023  ............. B60B 35/16
CN      113335378 A   *  9/2021  ............. B60K 17/22
(Continued)

OTHER PUBLICATIONS

Machine translation of CN 218702536 U, Du et al., Mar. 24, 2023 (Year: 2023).*

(Continued)

*Primary Examiner* — Vinh Luong
(74) *Attorney, Agent, or Firm* — Cheng-Ju Chiang (57) ABSTRACT

A split-type hard front axle includes an axle housing; an axle tube connected to the axle housing; an inner-C-forging located at an end of the axle tube for connecting with a kingpin knuckle; and a connection structure cooperated with the inner-C-forgoing, for detachably fixing the inner-C-forging on the axle tube. The axle tube is provided with a first angle adjustment structure. The inner-C-forging is provided with a second angle adjustment structure. The inner-C-forging is sleeved on the axle tube, and the connection structure is inserted into the axle tube, to fix the inner-C-forging on the axle tube. The first angle adjustment structure is capable of cooperating with different portions of the second angle adjustment structure to make the inner-C-forging have different installation angles on the axle tube, and a caster to pinion angle is different at inner-C-forging's different installation angles. A vehicle is also provided.

14 Claims, 8 Drawing Sheets

(58) Field of Classification Search
USPC .......................................................... 74/607
See application file for complete search history.

(56) References Cited

U.S. PATENT DOCUMENTS

| | | | |
|---|---|---|---|
| 5,628,578 A | 5/1997 | McClanahan et al. | |
| 7,029,398 B1* | 4/2006 | Burnard | F16D 3/387 403/14 |
| 9,096,259 B2* | 8/2015 | Varela | B62D 7/18 |
| 11,203,231 B1* | 12/2021 | Du | F16B 7/0406 |
| 11,214,094 B1* | 1/2022 | Du | F16B 7/182 |
| 2005/0140130 A1 | 6/2005 | Laisement et al. | |
| 2010/0190559 A1* | 7/2010 | Duncan | F16D 3/387 403/57 |
| 2013/0294824 A1 | 11/2013 | Pisinger | |
| 2014/0356062 A1 | 12/2014 | Janvier et al. | |
| 2017/0036693 A1* | 2/2017 | Reid | B60B 35/16 |
| 2019/0126979 A1* | 5/2019 | Johnson | B62D 55/084 |
| 2019/0242438 A1* | 8/2019 | Corpus | F16D 3/387 |
| 2020/0070883 A1* | 3/2020 | Du | B62D 7/18 |
| 2022/0324285 A1* | 10/2022 | Wilcox | B60G 3/20 |
| 2023/0241914 A1* | 8/2023 | Du | B60B 35/14 301/124.1 |

FOREIGN PATENT DOCUMENTS

| | | | | |
|---|---|---|---|---|
| CN | 218702536 U | * | 3/2023 | ............ B60B 35/00 |
| KR | 10-1342666 B1 | | 12/2013 | |

OTHER PUBLICATIONS

Define forging, Microsoft Bing, Nov. 3, 2023 (Year: 2023).*
Define installation, Microsoft Bing, Nov. 4, 2023 (Year: 2023).*

* cited by examiner

SPLIT FRONT AXLE AND VEHICLE HAVING SAME

CROSS REFERENCE TO RELATED APPLICATION

The present patent document claims the benefit of priority of Chinese patent application number 202220246510.7, filed on Jan. 30, 2022, and entitled "SPLIT-TYPE HARD FRONT AXLE AND VEHICLE HAVING SAME". The entire disclosure of the above-identified application is incorporated herein by reference.

TECHNICAL FIELD

The present document relates to automobile structures, in particular to a split front axle and a vehicle having the same.

BACKGROUND

Since the launch of the first off-road vehicle model, the appearance, interior trim, four-wheel drive technology, and power system of the off-road vehicle have made great progress, however, as the core of the chassis, the integral front axle assembly has not been substantially improved.

SUMMARY

The present document discloses, among other things, a split front axle and a vehicle having the same. The split front axle can conveniently adjust the caster angle and the pinion to driveshaft angle independently while ensuring the support strength.

The split front axle includes an axle housing, an axle tube connected to an end of the axle housing, an inner-C-forging disposed on the axle tube at an end away from the axle housing and configured for connecting with a kingpin knuckle, and a connection structure configured for detachably fixing the inner-C-forging on the axle tube. The axle tube is provided with a first angle adjustment structure formed on an outer wall thereof. The inner-C-forging is provided with a connecting ring. The connecting ring is provided with a second angle adjustment structure. The inner-C-forging is sleeved on the outer wall of the axle tube through the connecting ring, with the first angle adjustment structure cooperating with the second angle adjustment structure. The connection structure is mounted to the axle tube at an end which is away from the axle housing, to fix the inner-C-forging on the axle tube. One of the first angle adjustment structure and the second angle adjustment structure is provided with a plurality of protrusions, the other one of the first angle adjustment structure and the second angle adjustment structure is provided with a plurality of depressions. An installation angle formed between the inner-C-forging and the axle tube is capable of being regulated in response to a regulation of a cooperation angle formed between the first angle adjustment structure and the second angle adjustment structure.

In some embodiments, the split front axle includes two axle tubes and two inner-C-forgings, the two inner-C-forgings are detachably arranged on the two axle tubes through the connection structures respectively.

In some embodiments, one of the first angle adjustment structure and the second angle adjustment structure is provided with a plurality of protrusions, the other one of the first angle adjustment structure and the second angle adjustment structure is provided with a plurality of depressions, the protrusions or the depressions are disposed along a circumferential direction of a corresponding axle tube or a circumferential direction of the connecting ring, the second angle adjustment structure has different cooperation positions on the first angle adjustment structure by means of the cooperation of different protrusions and different depressions.

In some embodiments, both of the first angle adjustment structure and the second angle adjustment structure are provided with a plurality of gear teeth arranged at intervals along respective circumferential directions, the protrusions are the gear teeth, and the depressions are formed between adjacent gear teeth.

In some embodiments, the connection structure includes a connection tube and a flange, the flange is formed at an end of the connection tube and radially extending outwardly from an outer wall of the connection tube, the connection tube is inserted into the axle tube with the flange abutting against the inner-C-forgoing at the end away from the axle housing.

In some embodiments, the connection tube is fixed to the axle tube by taper fit connection or threaded connection.

In some embodiments, the inner-C-forging is provided with an accommodating space at an end away from the axle housing, the flange is received in the accommodating space when the inner-C-forging is fixed to the axle tube by the connection structure.

In some embodiments, a diameter of the first angle adjustment structure is greater than a diameter of the axle tube.

In some embodiments, both of a diameter of the first angle adjustment structure and a diameter of the second angle adjustment structure gradually increase from an end away from the axle housing toward an end close to the axle housing.

In some embodiments, the inner-C-forgings are provided with two opposite connecting holes for fixing the kingpin knuckle, the two connecting holes are respectively arranged at opposite sides of an axis of the axle tube.

The present document also discloses a vehicle, which includes the above split front axle.

In some embodiments, the inner-C-forging on at least one of the axle tubes is separately arranged from the corresponding axle tube, and the inner-C-forging is detachably sleeved on the outer wall of the axle tube. When it is necessary to adjust the caster angle, the components on one side of the vehicle can be disassembled, and then the connection structure is released, and the inner-C-forging is rotated around its own axis to a suitable angle, such that the protrusions engage with the corresponding depressions. This can change the installation angle of the inner-C-forging relative to the axle tube, and change the angle of the installation point, and further can adjust the caster angle. After the adjustment is completed, the inner-C-forging is re-fixed to the axle tube by the connection structure. Through the above method, the installation angle of the inner-C-forging relative to the axle tube can be changed, and the angle of the installation point can be changed, and the caster angle can be adjusted as well. Therefore, under the premise of ensuring the support strength, the split front axle can easily adjust the caster angle and the caster to kingpin angle on both sides of the vehicle independently. Meanwhile, the positions and angles of the installation points of the components on the axle tube are still kept as original, and variables that affect the chassis wheelbase, the directional accuracy, and the suspension height can not be introduced.

DETAILED DESCRIPTION OF PREFERRED EMBODIMENTS

In order to make the purpose, the technical solutions and the advantages of the present document, various embodiments will be further described in detail.

It should be noted that in the description, terms such as "first" and "second" are used to distinguish similar objects, and are not necessarily used to describe a specific order or sequence. It is to be understood that the data so used are interchangeable under appropriate circumstances such that the embodiments described herein can be practiced in sequences other than those illustrated or described herein.

In the present document, the orientation or positional relationship indicated by the terms "upper", "lower", "top", "bottom", etc. are based on the orientation or positional relationship shown in the drawings, and are only for the convenience of describing and for simplifying the description , rather than indicating or implying that the device or element must have a specific orientation, be constructed and operate in a specific orientation, and thus should not be construed as limitation of the embodiment. The X direction refers to the length direction of a vehicle, the Y direction refers to the width direction of the vehicle, and the Z direction refers to the height direction of the vehicle.

In addition, unless be clearly specified and limited, terms such as "install", "connect", "link" and "fix" in the present document should be interpreted in a broad sense. For example, the term may be used to describe a fixed connection or a detachable connection, or an integration into a single piece; directly connected, or indirectly connected through an intermediary, and may be an internal communication between two elements or an interaction relationship between two elements, unless otherwise clearly defined. For those of ordinary skill in the art the specific meanings of the above terms in the present document can be understood according to specific situations.

Brief Introduction

In the past 25 years, the global sales of off-road vehicles have exceeded 30 million, and consumers' demand for customization and modification of such models is also increasing day by day. For global automakers and modification shops, changing to bigger tires, replacing or enhancing the suspension system to lift the vehicle chassis for more ground clearance, and making the overall appearance of the vehicle more attractive have become the most common ways of customization in the industry. However, the lift of the vehicle chassis also brings the following pain points (technical limitations) that obviously affect the vehicle handling experience, moreover, seriously threaten the safety of the people in the vehicle.

The first pain point is related to the transmission system: the driveshaft or the transfer case is abnormally worn, rapidly damaged, and has obvious chassis resonance, and the transmission torque cannot be fully released, which affects the power output.

The second pain point is related to the return-to-center capability: the extremely poor handling feeling, the front wheel shimmy, the wobbly direction, the weakened wheel return-to-center capability after coming out of a turn, and the requirement of constant correction of direction above medium speed.

The third pain point is related to the cruise driving capability: the increase of tire diameter, the uneven wear, the individual product deviation when leaving the factory, the left-right imbalance of the suspension system, and other factors introduced after the lift of the vehicle chassis jointly cause the vehicle fail to run straight and even sway to left and right when cruising at medium and high speeds. Slight vehicle deviation symptoms will lead to abnormal tire wear and tire scrapping, and serious vehicle deviation symptoms will lead to tire blowout, vehicle out of control and other dangerous situations.

The fourth pain point is related to chassis posture: the inconsistencies in the left and right wheelbases cause the tires do serpentine motion, exacerbate the abnormal wear of all the ball joints or rubber sleeves of the control arm, result in loose and unstable feeling of the chassis, abnormal noise, and a sharp drop of handling experience.

The fifth pain point is related to direction control: the steering wheel swing, the uncomfortable and numb handling feeling, and the pulling sensation generated when passing the speed bump, fierce refueling, and slamming on the brakes.

The sixth pain point is related to the maintenance cost: the core chassis components/accessories that need to be replaced after abnormal wear or attenuation, the entire axle that needs to be replaced after the deformation of the inner-C-forgings and the axle housing caused by medium and high-strength off-roading, and the hydraulic steering system that is added to alleviate the extremely poor handling experience and so on, all of these brings a subsequent high maintenance cost of the vehicle.

The fundamental reason why the above problems can not be solved is the common structural defect of all the integral front axle assemblies in the current market: the caster angles and the pinion to driveshaft angle on both sides of the vehicle can not be adjusted independently, thus, consumers can only bear various vehicle handling problems and major potential safety hazards caused by this design. What global automakers and modification shops can do is to spend a lot of labor and time to continuously fine-tune the vehicles with underwhelming result, which leads to low customer satisfaction.

Theoretically speaking, the installation position of the inner-C-forging on the axle tube can be changed by the split design of the inner-C-forging and the axle tube, and the caster angles and the pinion to driveshaft angle can be changed as well. However, how to design the connection structure between the inner-C-forging and the axle tube, so as to achieve a reliable and ease to use performance has become an urgent problem to be solved in the industry.

Embodiments

Figure 8:
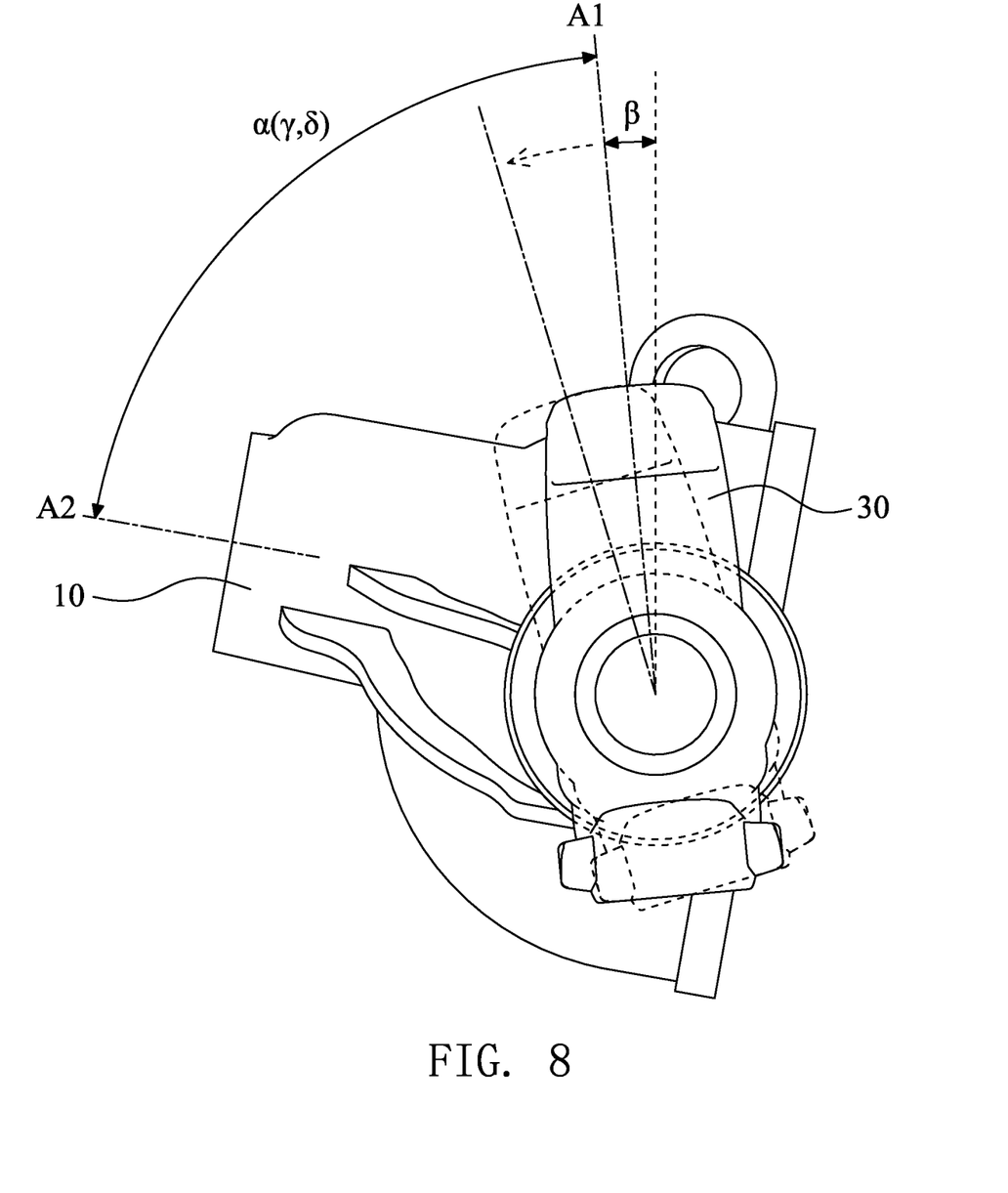
FIG. 8 is a schematic view showing the pinion to driveshaft angle.

In one example aspect, the present document provides a split front axle and a vehicle having the same. The split front axle can conveniently adjust a caster angle $\beta$ (shown in FIG.

8) and a pinion to driveshaft angle α (shown in FIG. 8) of the vehicle independently while ensuring the supporting strength.

As shown in FIGS. 1 to 4, a split front axle includes an axle housing 10, two axle tubes 20, two inner-C-forgings 30, and at least one connection structure 40. The axle tubes 20 are disposed at two opposite sides of the axle housing 10 respectively. The inner-C-forgoing 30 is located at an end of the axle tube 20 which is away from the axle housing 10 and is used to connect a kingpin knuckle. At least one inner-C-forgoing 30 is detachably fixed to a corresponding axle tube 20 by a corresponding connection structure 40. An outer wall of the axle tube 20 is provided with a first angle adjustment structure 21. The inner-C-forging 30 is provided with a connecting ring 31, and a second angle adjustment structure 32 is formed on an inner wall of the connecting ring 31. One of the first angle adjustment structure 21 and the second angle adjustment structure 32 is provided with a plurality of protrusions 21a, and the other one of the first angle adjustment structure 21 and the second angle adjustment structure 32 is provided with a plurality of depressions 32a. The plurality of protrusions 21a and the plurality of depressions 32a are respectively arranged at intervals along a circumferential direction of the axle tube 20 or along a circumferential direction of the connecting ring 31. The connecting ring 31 of the inner-C-forgoing 30 is sleeved on the outer wall of the axle tube 20, with the protrusions 21a extending into the depressions 32a. The connection structure 40 connects the inner-C-forgoing 30 to the end of the axle tube 20. By means of the combinations of the protrusions 21a with different depressions 32a, the second angle adjustment structure 32 may have different cooperation angles δ with the first angle adjustment structure 21, and the inner-C-forgoing 30 may have different installation angles γ on the axle tube 20. In different installation angles γ, an included angle (shown in FIG. 8, i.e., the pinion to driveshaft angle α) formed between an axis A1 of a kingpin installation point and an axis A2 of a driveshaft installation point is different.

In this embodiment, by means of separately arranging at least one inner-C-forging 30 from a corresponding axle tube 20, and detachably disposing the inner-C-forging 30 around the outer wall of the axle tube 20, when it is required to adjust the caster angle β, the components on one side of the vehicle can be disassembled, and then the connection structure 40 can be released, and the inner-C-forging 30 can be rotated around its own axis to a suitable angle, such that the protrusions 21a can engage with the corresponding depressions 32a. This can change the installation angle γ of the inner-C-forging 30 on the axle tube 20, and the angle of the installation point can be changed accordingly, and then the caster angle β can be adjusted. After the adjustment is completed, the inner-C-forging 30 is re-fixed to the axle tube 20 by the connection structure 40.

Because the inner-C-forging 30 can be rotated around its own axis toward a front side of the vehicle, or toward a rear side of the vehicle, no matter the caster angle β on which side of the vehicle needs to be adjusted, it can be realized by adjusting the installation angle γ of the corresponding inner-C-forging 30. In some embodiments, since the inner-C-forgings 30 are separately arranged from the axle tube 20, the integrity of the axle tube 20 is ensured, and all of the installation points of the components on the axle tube 20, such as the support point of the shock absorber, and the connection point of the pull rod, and etc., can be arranged on the integral axle tube 20, which can improve the strength of the front axle. Therefore, on the premise of ensuring the support strength, the split front axle can easily adjust the caster angle β and the pinion to driveshaft angle α of the vehicle independently. Meanwhile, the positions and angles of the component installation points are still kept as original, and variables affecting the chassis wheelbase, the directional accuracy, and the suspension height cannot be introduced.

Furthermore, in this embodiment, the two axle tubes 20 are both connected to the corresponding inner-C-forgings 30 by the connection structures 40 at their respective ends.

Figure 5:
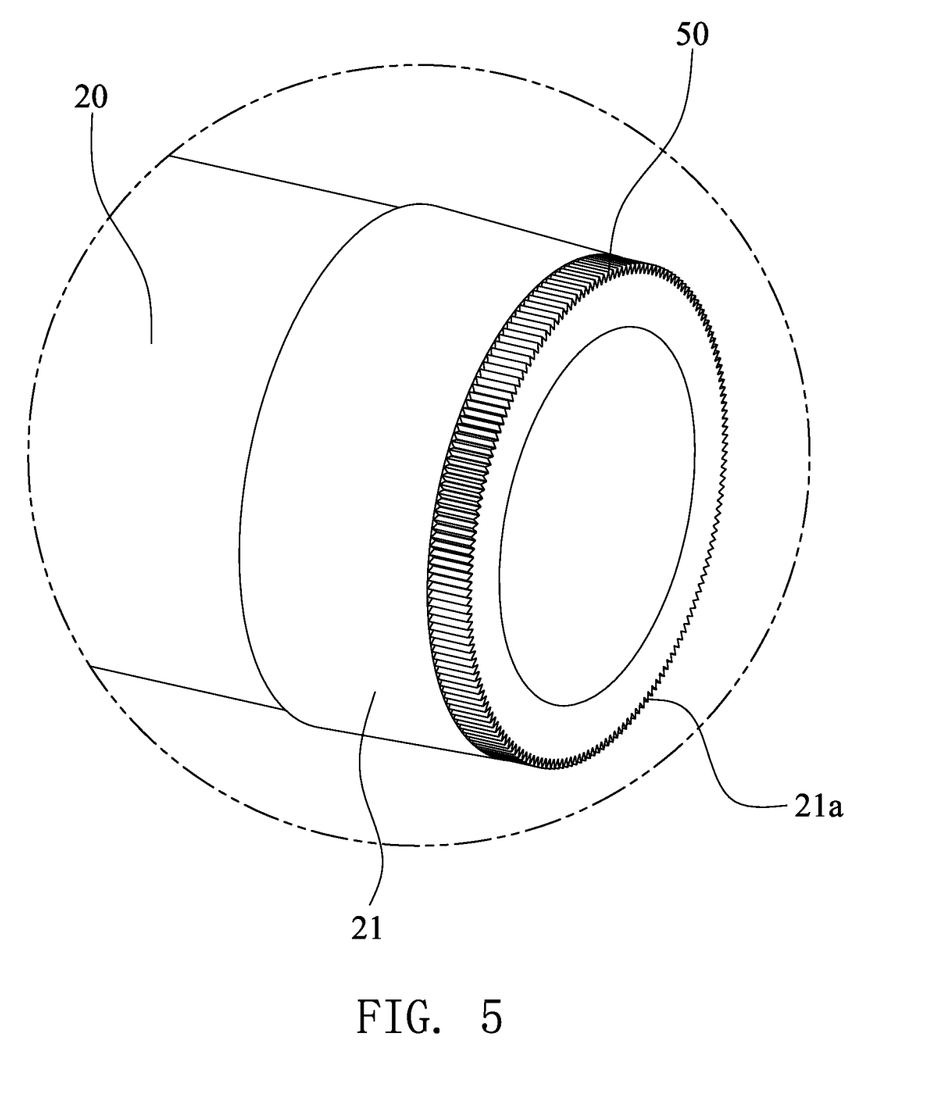
FIG. 5 is a schematic, enlarged view of circle V in FIG. 2.
Figure 6:
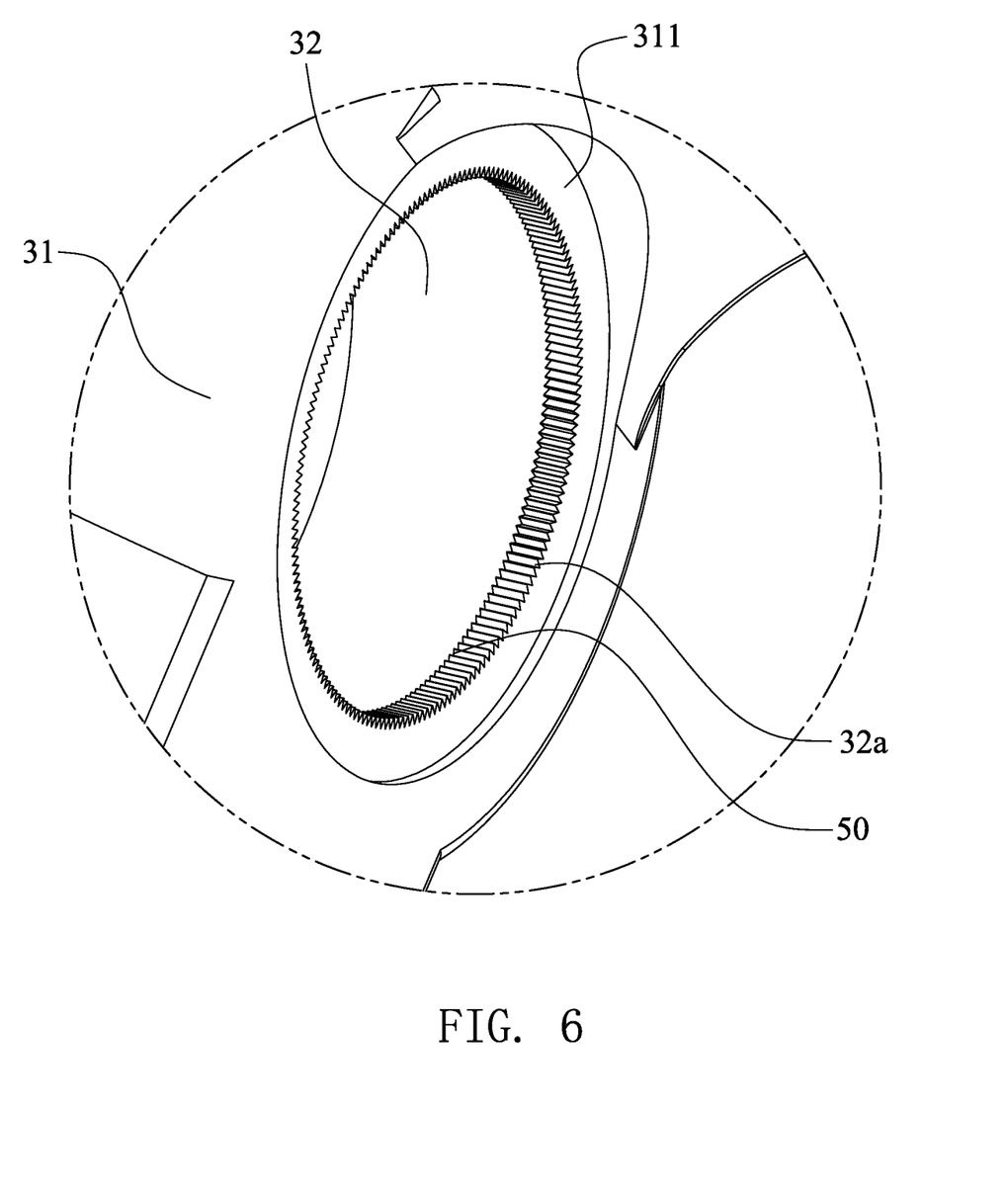
FIG. 6 is a schematic, enlarged view of circle VI in FIG. 2.

As shown in FIG. 5 and FIG. 6, the first angle adjustment structure 21 and the second angle adjustment structure 32 each is provided with a plurality of gear teeth 50 arranged at intervals along its circumferential direction, that is, in this embodiment, the protrusions 21a are the gear teeth 50, and the depressions 32a are formed between adjacent gear teeth 50. By means of the engagement of the gear teeth 50 on one adjustment structure and the depressions 32a on the other adjustment structure, the circumferential positions of the inner-C-forging 30 on the axle tube 20 are determined.

Figure 2:
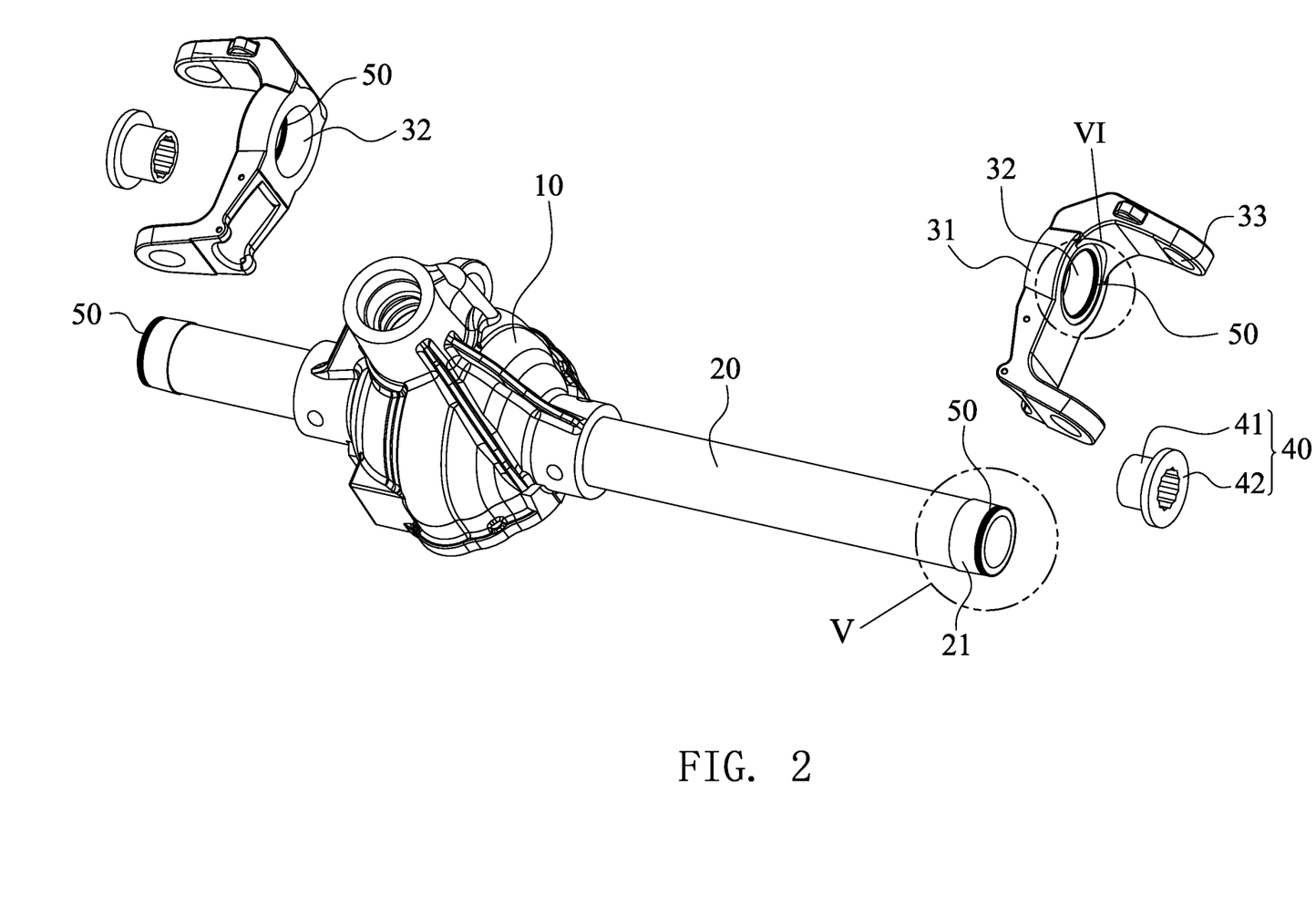
FIG. 2 is a schematic, exploded view of the split front axle in FIG. 1.
Figure 3:
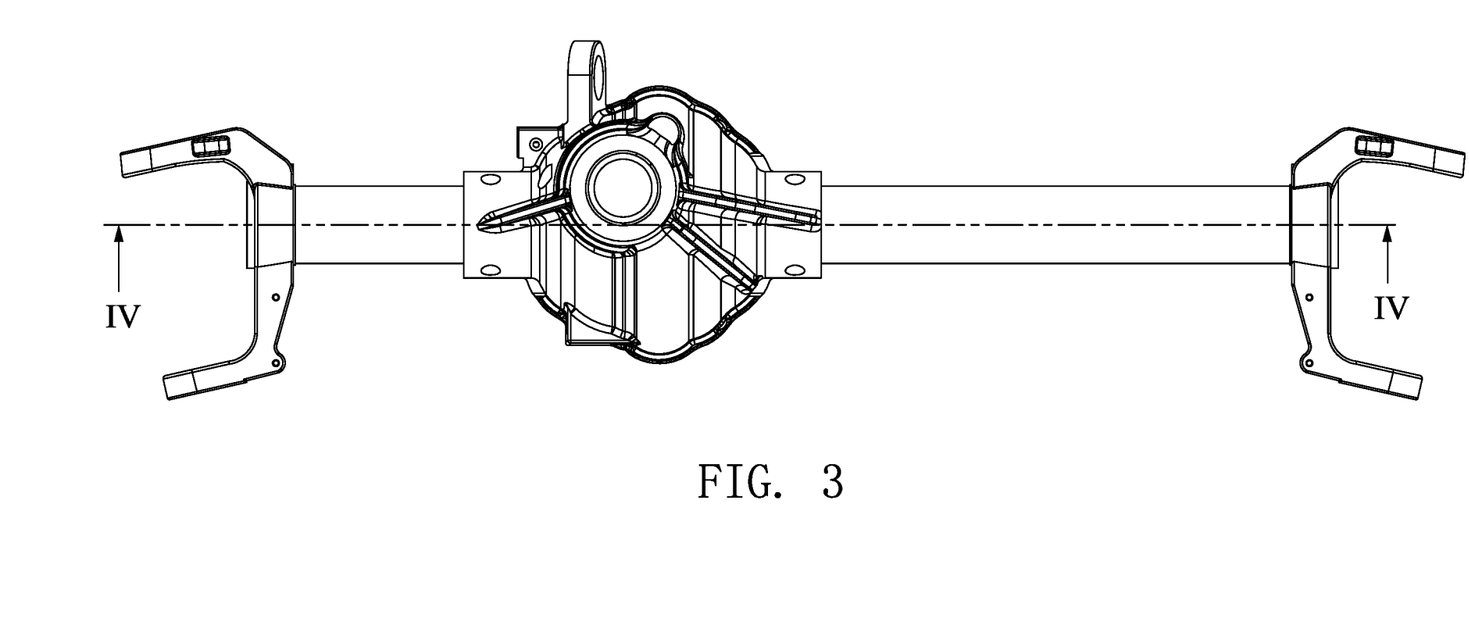
FIG. 3 is a schematic, front view of the split front axle in FIG. 1.
Figure 4:
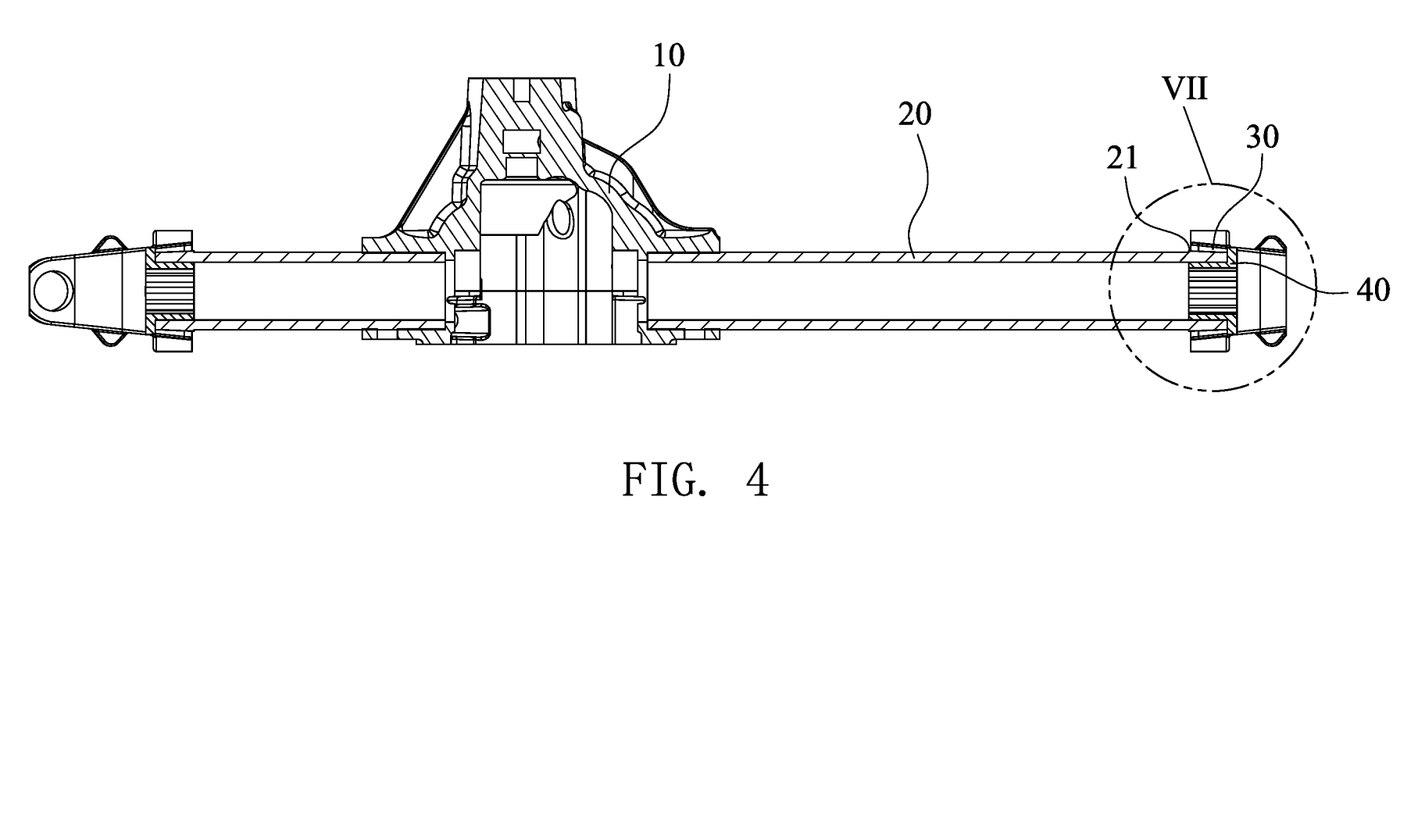
FIG. 4 is a schematic, cross-sectional view taken along line IV-IV of FIG. 3.
Figure 7:
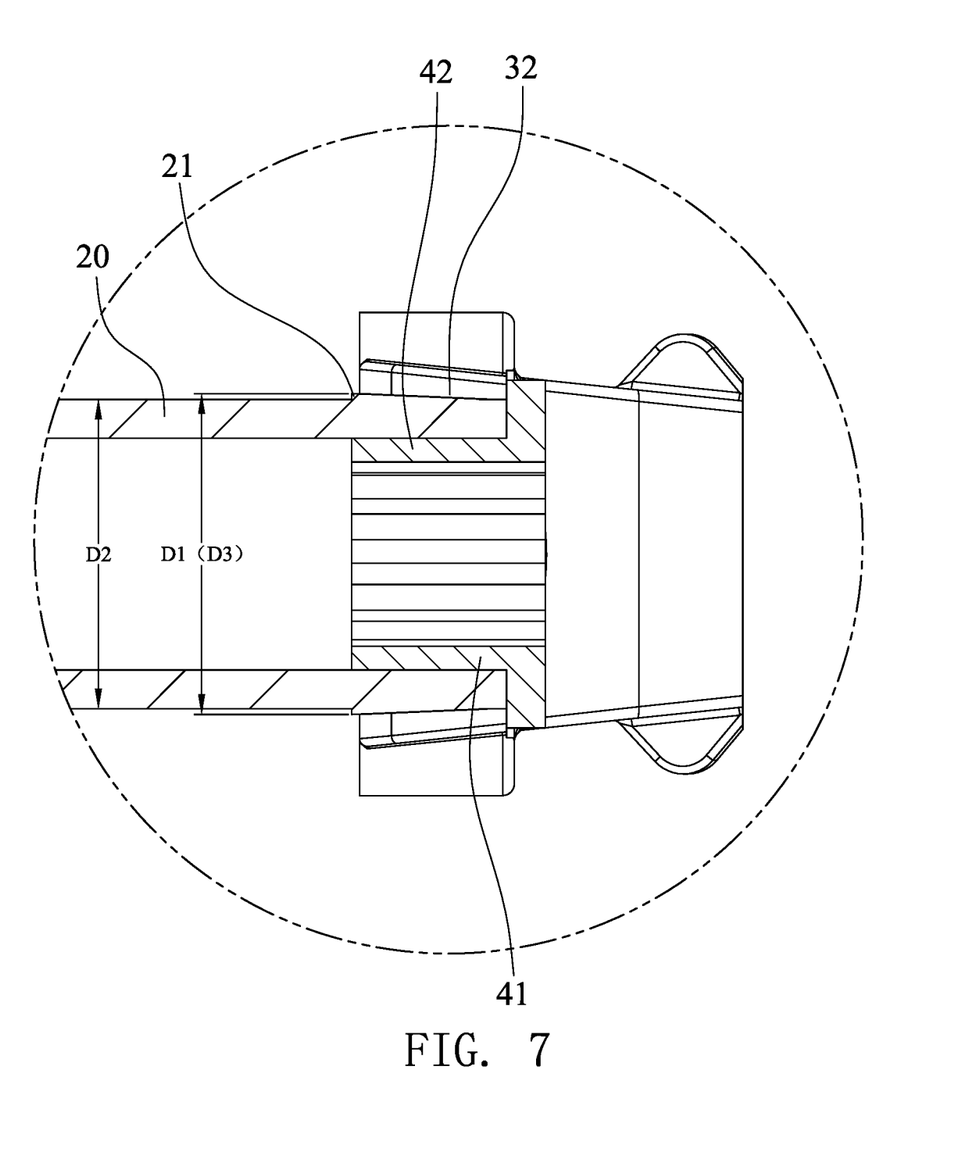
FIG. 7 is a schematic, enlarged view of circle VII in FIG. 4.

As shown in FIG. 2 and FIG. 7, the connection structure 40 includes a hollow connection tube 41 and a flange 42. The flange 42 is formed on one end of the connection tube 41 and radially extends outwardly from an outer wall of the end of the connection tube 41. The connection tube 41 is axially inserted into the axle tube 20, with the flange 42 resting against the end surface of the inner-C-forging 30 away from the axle housing 10, so as to prevent the inner-C-forging 30 from falling off from the axle tube 20. The connection tube 41 can be fixed to the axle tube 20 through taper fit or threaded connection manner. That is to say, the connection tube 41 can be fixed to the axle tube 20 through an interference fit connection between taper surfaces respectively formed at an inner wall of axle tube 20 and an outer wall of the connection tube 41, or can be fixed to the axle tube 20 through threads respectively formed on the inner wall of axle tube 20 and the outer wall of the connection tube 41. In some embodiments, through the arrangement of the connecting ring 31 and the connection tube 41, it is possible to avoid the influence of the above improvement of the structures on the arrangement of the driveshaft in the axle tube 20, such that the driveshaft can still transmit power to the wheels as in the prior art.

As shown in FIG. 5 and FIG. 7, an outer diameter D1 of the first angle adjustment structure 21 is greater than an outer diameter D2 of the axle tube 20, that is, the first angle adjustment structure 21 is formed on an annular projection radially extending outwardly from the outer wall of the axle tube 20. By means of the arrangements of the above structure, the strength of the axle tube 20 is strengthened at a position where the first angle adjustment structure 21 locates.

Referring to FIG. 5 and FIG. 7, in this embodiment, the outer diameter D1 of the first angle adjustment structure 21 and an outer diameter D3 of the second angle adjustment structure 32 are gradually increased from an end away from the axle housing 10 to an end close to the axle housing 10. That is, the outer diameter D1 of the first angle adjusting structure 21 and the outer diameter D3 of the second angle adjusting structure 32 gradually increase from the right side to the left side in FIG. 7.

Due to the above change trend of the diameters, when the connecting ring 31 of the inner-C-forging 30 is sleeved on the outer wall of the axle tube 20, it can prevent the connecting ring 31 from moving toward the end close to the axle housing 10. At the end of the connecting ring 31 which is far away from the axle housing 10, the flange 42 can prevent the connecting ring 31 from moving toward a direction far away from the axle housing 10. Therefore, the inner-C-forging 30 can be fixed along the axial direction of the axle tube 20.

Referring to FIG. 6, in this embodiment, an accommodating space 311 is formed in the inner-C-forging 30 at the end which is far from the axle housing 10, with an outer diameter of the accommodating space 311 being greater than an inner diameter of the connecting ring 31. When the connection structure 40 fixes the inner-C-forging 30 to the axle tube 20, the flange 42 is received in the accommodating space 311.

Figure 1:
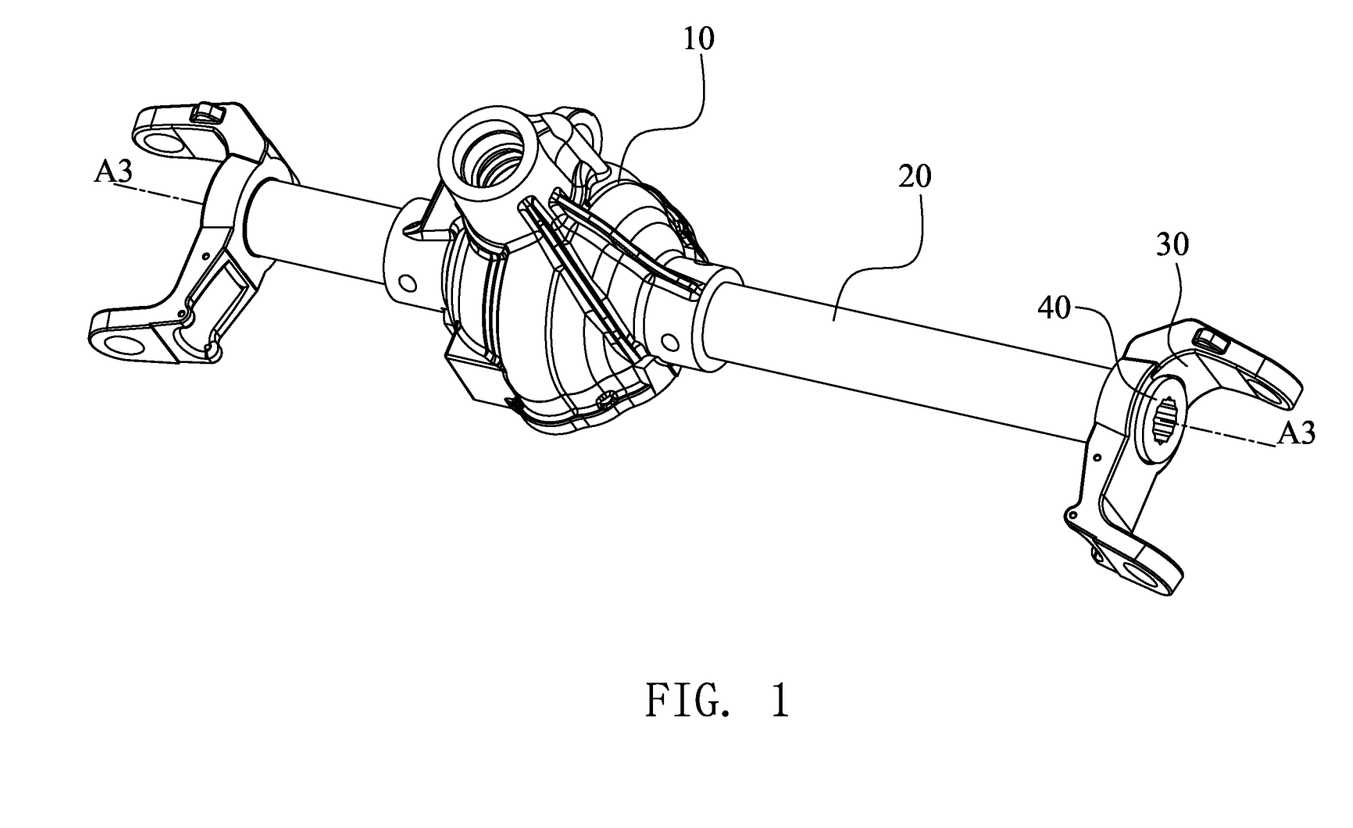
FIG. 1 is a schematic view of an example of a split front axle.

Referring to FIG. 1 and FIG. 2, in the present embodiment, two opposite connecting holes 33 are respectively formed on the inner-C-forgings 30, and the connecting holes 33 are respectively arranged at opposite sides of the axis A3 of the axle tube 20, and the kingpin may be inserted in the two connecting holes 33. Under such arrangement, an axis of the kingpin, or an axis of the installation point of the kingpin can be regarded as coincide with a line connecting centers of the two connecting holes 33.

Referring to FIG. 8, the included angle formed between the axis of the kingpin installation point and the axis of the driveshaft installation point is shown, that is, the installation angle γ between the inner-C-forging 30 and the driveshaft is shown in this Figure. Through the above arrangement, the included angle can be adjusted within a certain range without disassembly of peripheral components. In some embodiments, the above arrangement can also meet the requirements of various types of vehicles when adjusting the caster angle β.

In some embodiments, the inner-C-forging 30 on at least one of the axle tubes 20 is separately arranged from the corresponding axle tube 20, and the inner-C-forging 30 is detachably sleeved on the outer wall of the axle tube 20. When it is required to adjust the caster angle β, the components on one side of the vehicle can be disassembled, and then the connection structure 40 is released, and the inner-C-forging 30 is rotated around its own axis to a suitable angle, such that the protrusions 21a engage with the corresponding depressions 32a. This can change the installation angle γ of the inner-C-forging 30 relative to the axle tube 20, and change the angle of the installation point, and further can adjust the caster angle β. After the adjustment is completed, the inner-C-forging 30 is re-fixed on the axle tube 20 through the connection structure 40. Through the above method, the installation angle γ of the inner-C-forging 30 relative to the axle tube 20 can be changed, and the angle of the installation point can be changed, and the caster angle β can be adjusted as well. Therefore, under the premise of ensuring the support strength, the split front axle can easily adjust the caster angle β and the pinion to driveshaft angle α on both sides of the vehicle independently. Meanwhile, the positions and angles of the installation points of the components on the axle tube 20 are still kept as original, and variables that affect the chassis wheelbase, the directional accuracy, and the suspension height can not be introduced.

Some embodiments may include a vehicle, which includes the above-mentioned split front axle. Other technical features of the vehicle are common knowledge in the field, and will not be repeated here.

The above descriptions are only preferred embodiments, and it should be pointed out that for those of ordinary skill in the art, without departing from the principle of the present document, some improvements and modifications can also be made, and these improvements and modifications are also considered to be included in the protection scope of the present document.

What is claimed is:

1. A split front axle, comprising:
an axle housing;
an axle tube connected to an end of the axle housing;
an inner-C-forging disposed on the axle tube at an end away from the axle housing; and
a connection structure configured for detachably fixing the inner-C-forging on the axle tube;
the axle tube being provided a first angle adjustment structure formed on an outer wall thereof, the inner-C-forging being provided a connecting ring, the connecting ring being provided a second angle adjustment structure, the inner-C-forging being sleeved on the outer wall of the axle tube through the connecting ring, with the first angle adjustment structure cooperating with the second angle adjustment structure, the connection structure being mounted to the axle tube at an end which is away from the axle housing, to fix the inner-C-forging on the axle tube, one of the first angle adjustment structure and the second angle adjustment structure is provided with a plurality of protrusions, the other one of the first angle adjustment structure and the second angle adjustment structure is provided with a plurality of depressions, an installation angle formed between the inner-C-forging and the axle tube being capable of being regulated in response to a regulation of a cooperation angle formed between the first angle adjustment structure and the second angle adjustment structure.

2. The split front axle according to claim 1, wherein the split front axle comprises two axle tubes and two inner-C-forgings, the two inner-C-forgings are detachably arranged on the two axle tubes through the connection structures respectively.

3. The split front axle according to claim 2, wherein the inner-C-forgings are provided with two opposite connecting holes, the two connecting holes are respectively arranged at opposite sides of an axis of the axle tube.

4. The split front axle according to claim 1, wherein the protrusions or the depressions are disposed along a circumferential direction of a corresponding axle tube or a circumferential direction of the connecting ring, the cooperation angle between the second angle adjustment structure and the first angle adjustment structure is capable of being regulated by means of changing the depressions that match with the protrusions.

5. The split front axle according to claim 4, wherein both of the first angle adjustment structure and the second angle adjustment structure are provided with a plurality of gear teeth arranged at intervals along respective circumferential directions, the protrusions are the gear teeth, and the depressions are formed between adjacent gear teeth.

6. The split front axle according to claim 1, wherein the connection structure comprises a connection tube and a flange, the flange is formed at an end of the connection tube and radially extending outwardly from an outer wall of the connection tube, the connection tube is inserted into the axle tube with the flange abutting against the inner-C-forgoing at the end away from the axle housing.

7. The split front axle according to claim 6, wherein the inner-C-forging is provided with an accommodating space at an end away from the axle housing, the flange is received in the accommodating space when the inner-C-forging is fixed to the axle tube by the connection structure.

8. The split front axle according to claim 1, wherein an outer diameter of the first angle adjustment structure is greater than an outer diameter of the axle tube.

9. The split front axle according to claim 1, wherein both of an outer diameter of the first angle adjustment structure and an outer diameter of the second angle adjustment structure gradually increase from an end away from the axle housing toward an end close to the axle housing.

10. A split front axle, comprising:
an axle housing;
an axle tube connected to an end of the axle housing;
an inner-C-forging located at an end of the axle tube away from the axle housing; and
a connection structure cooperated with the inner-C-forgoing, configured for detachably fixing the inner-C-forging on the axle tube;
the axle tube being provided a first angle adjustment structure, the inner-C-forging being provided a second angle adjustment structure, the inner-C-forging being sleeved on the outer wall of the axle tube, with the first angle adjustment structure cooperating with the second angle adjustment structure, the connection structure being axially mounted to the axle tube, to fix the inner-C-forging on the axle tube, the first angle adjustment structure and the second angle adjustment being provided with a plurality of protrusions and a plurality of depressions, each of the protrusions being capable of cooperating with different depressions, making the inner-C-forging have different installation angles on the axle tube.

11. The split front axle according to claim 10, wherein both of the first angle adjustment structure and the second angle adjustment structure comprise a plurality of gear teeth arranged along respective circumferential directions, the protrusions are the gear teeth, and the depressions are formed between adjacent gear teeth.

12. The split front axle according to claim 10, wherein the connection structure comprises a connection tube and a flange, the flange is formed at an end of the connection tube and radially extending outwardly from an outer wall of the connection tube, the connection tube is inserted into the axle tube with the flange abutting against the inner-C-forgoing at the end away from the axle housing.

13. The split front axle according to claim 12, wherein the inner-C-forging is provided with an accommodating space at an end away from the axle housing, the flange is received in the accommodating space when the inner-C-forging is fixed to the axle tube by the connection structure.

14. The split front axle according to claim 10, wherein both of an outer diameter of the first angle adjustment structure and an outer diameter of the second angle adjustment structure gradually increase from an end away from the axle housing toward an end close to the axle housing.

* * * * *